June 21, 1932.  V. HENDRICKSON  1,863,770
MACHINE FOR FORMING COMPOSITE CAN BODIES
Filed Nov. 11, 1926  7 Sheets-Sheet 4

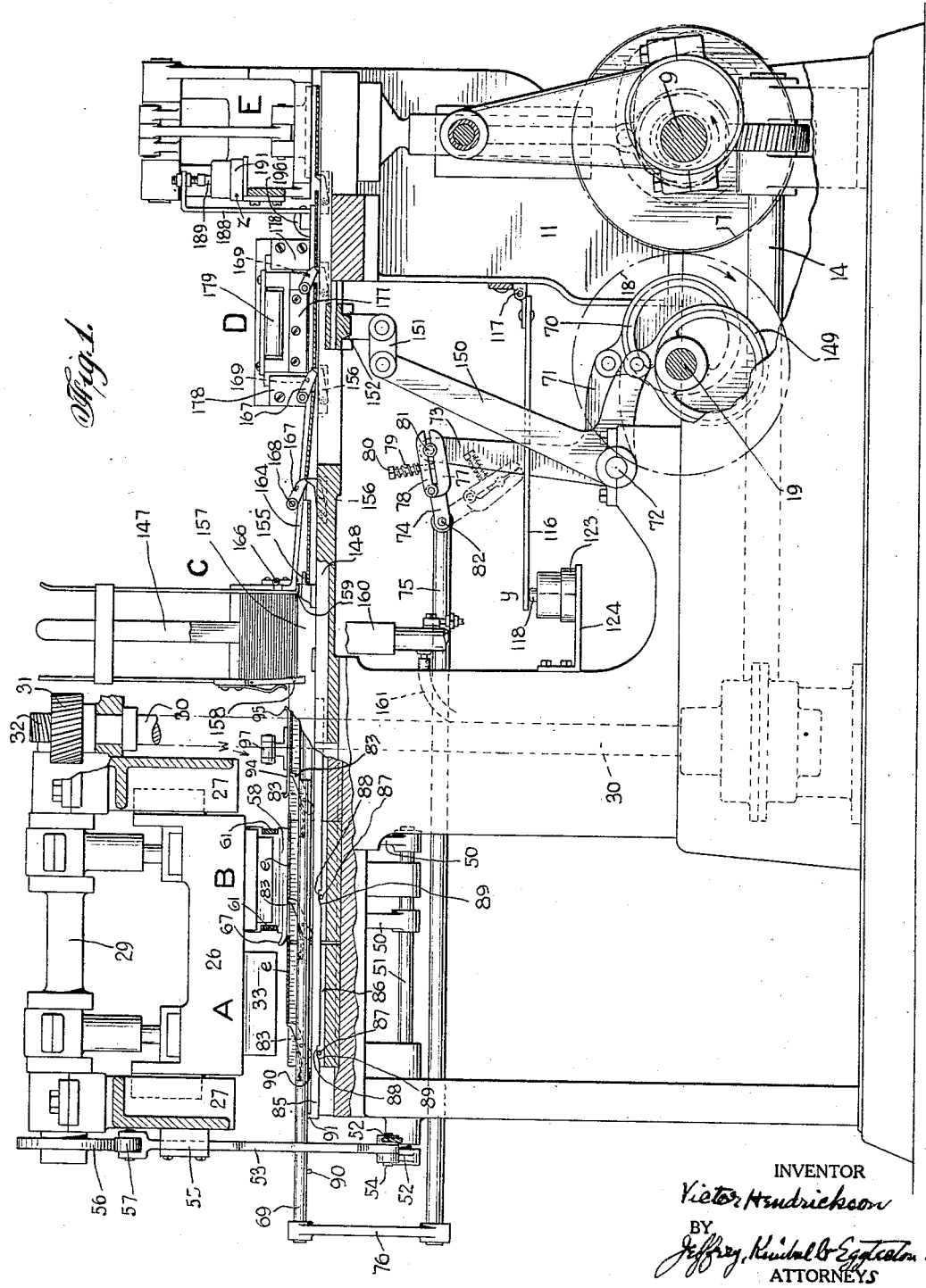

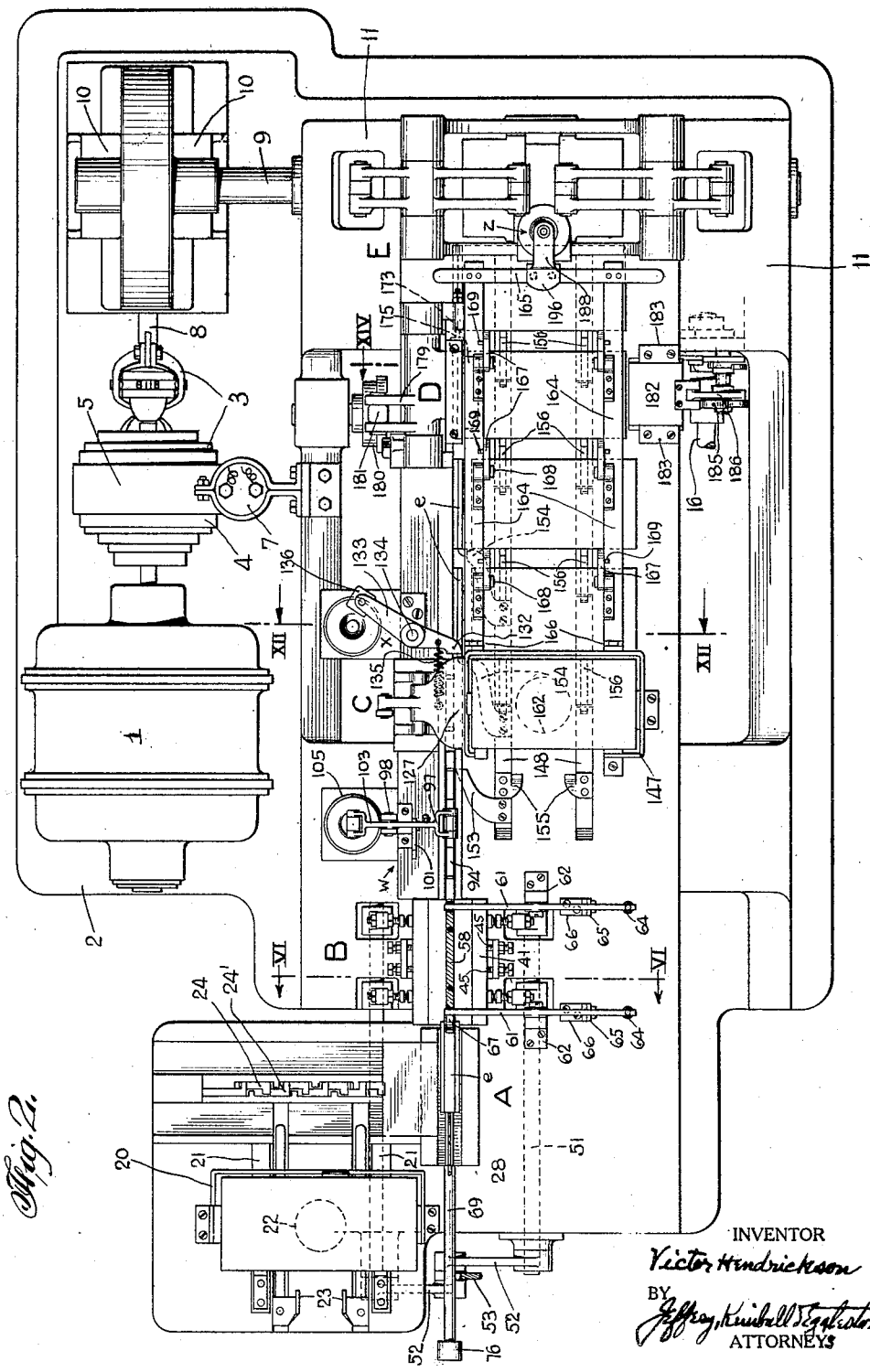

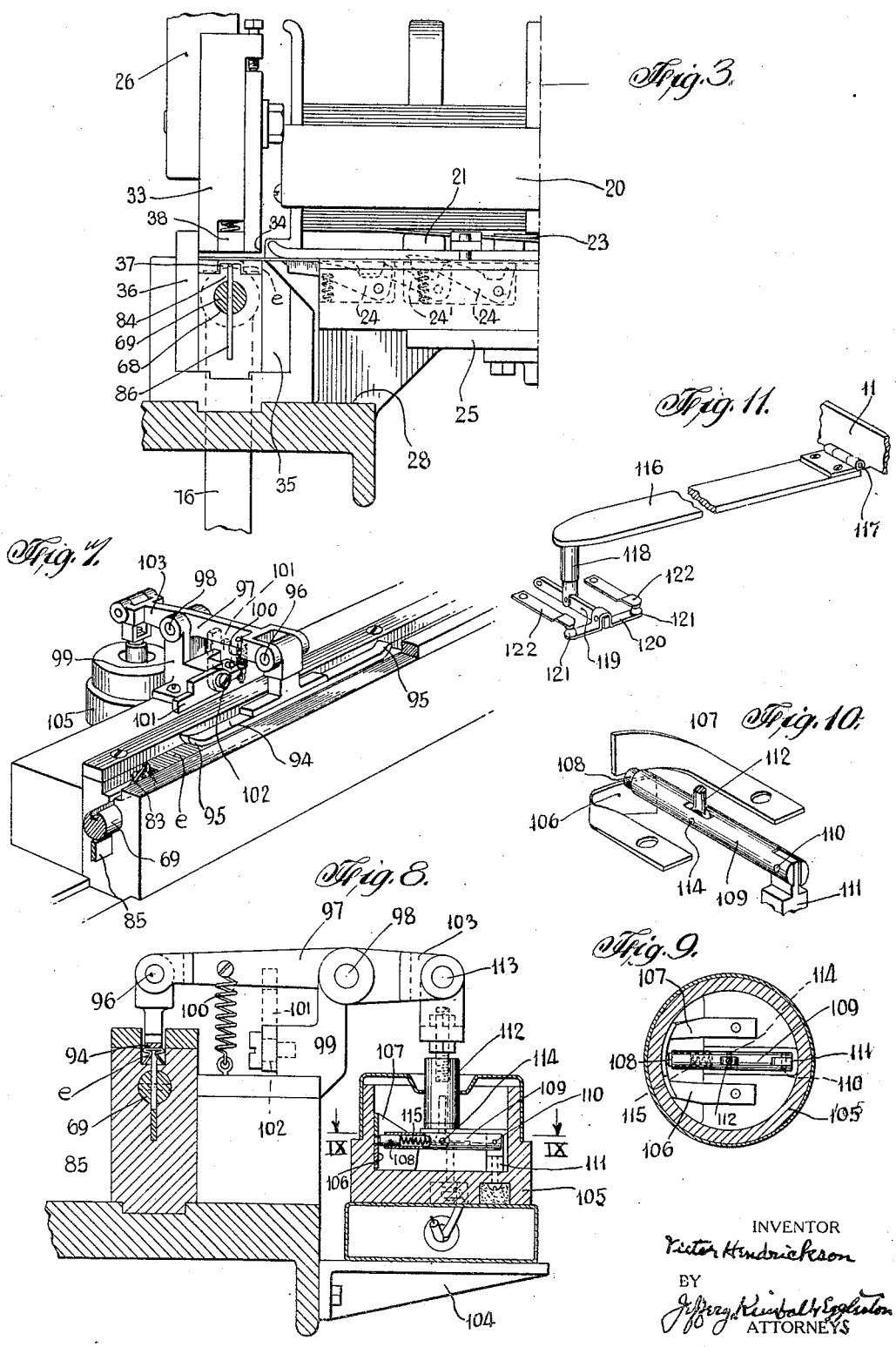

INVENTOR
Victor Hendrickson
BY
Jeffery, Kimball & Eggleston
ATTORNEYS

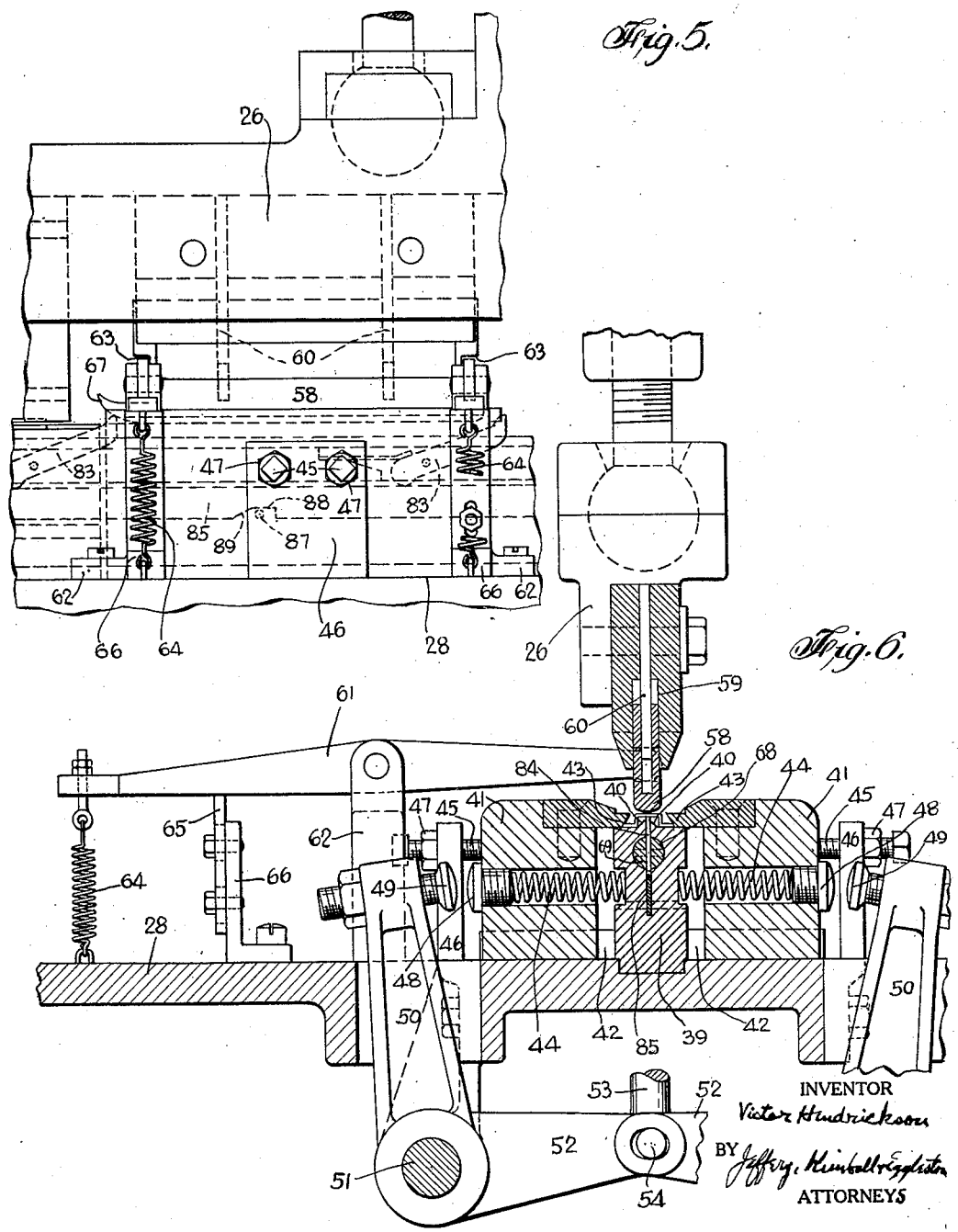

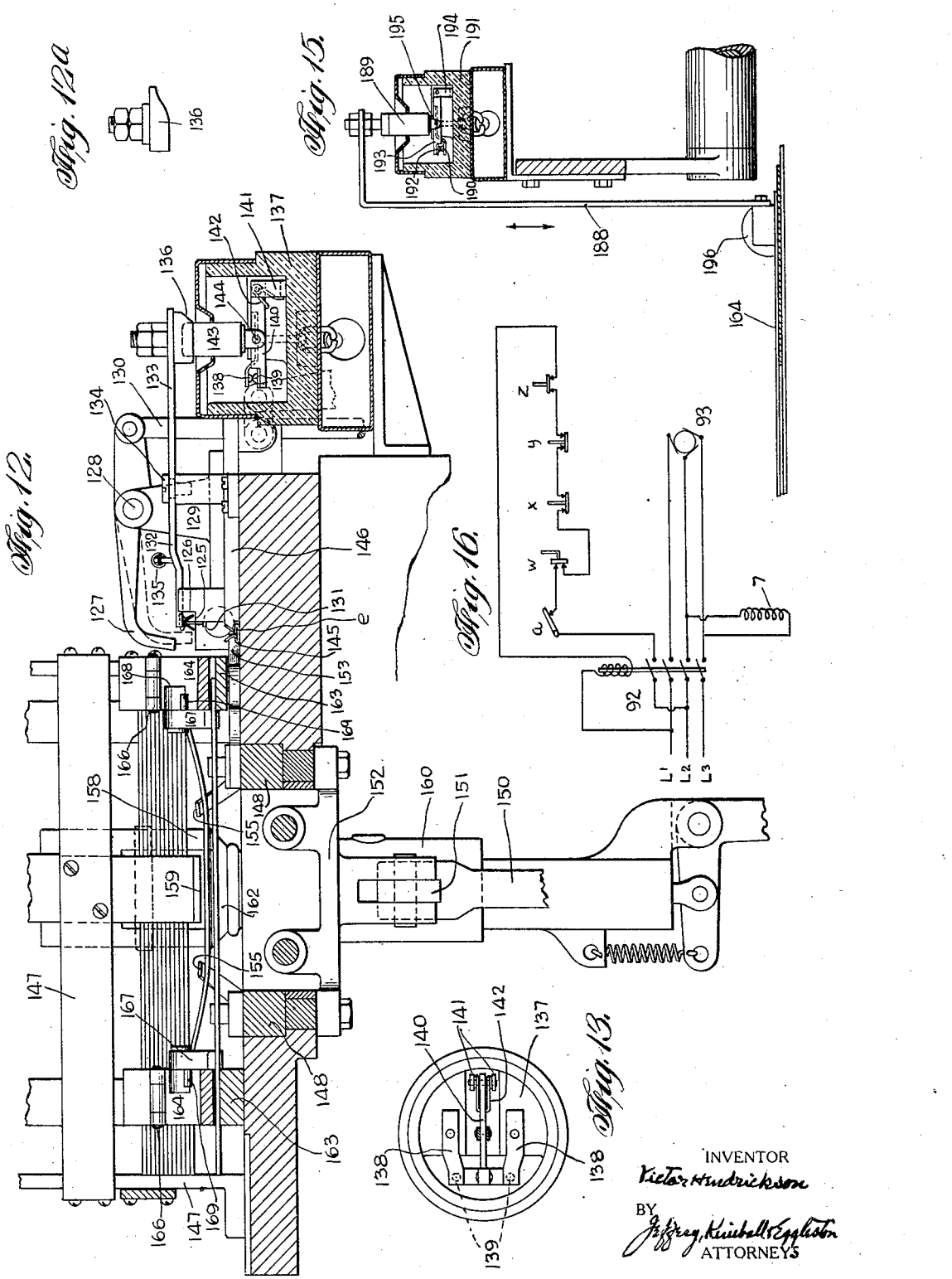

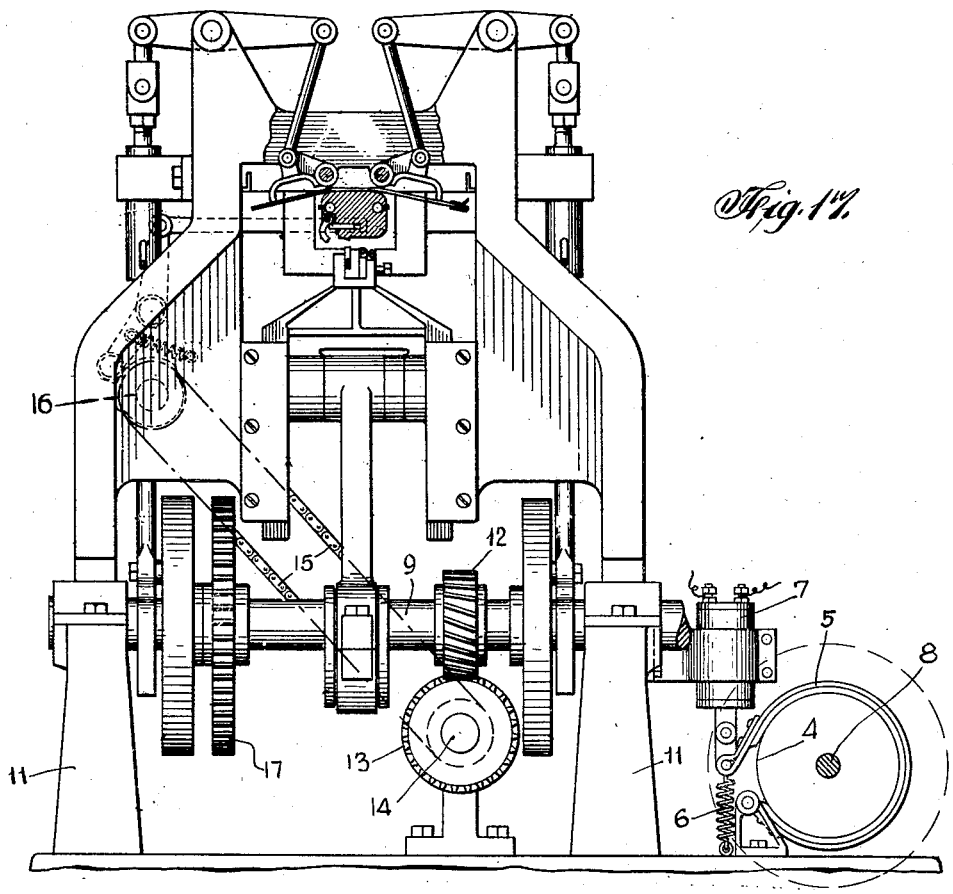

Patented June 21, 1932

1,863,770

UNITED STATES PATENT OFFICE

VICTOR HENDRICKSON, OF MANCHESTER, CONNECTICUT, ASSIGNOR TO THE ORFORD SOAP COMPANY, INC., OF MANCHESTER, CONNECTICUT, A CORPORATION OF CONNECTICUT

MACHINE FOR FORMING COMPOSITE CAN BODIES

Application filed November 11, 1926. Serial No. 147,670.

The invention of this application, although applicable also in other connections, is designed in the first instance as an improvement on the machine of my co-pending application for machine for forming composite can bodies, Ser. No. 39,903, filed June 27th, 1925, now Patent No. 1,807,843 issued June 2, 1931, to which it is here shown as applied, much of the mechanism illustrated in said earlier application being however omitted or shown diagrammatically in order to simplify the present application and to avoid complication by the inclusion of structure with which the present invention is not directly involved.

In this aspect the present invention has to do with the supervision and perfecting of certain of the feeds of the said machine and with bringing into play of stop motion mechanism on the occurrence of abnormal feed conditions at critical points in the machine. More broadly viewed it lies in the various novel structures and combinations set forth in the specification, or apparent therefrom to those skilled in the art, wherever they are applicable and in whatever forms they may be embodied.

The machine of this and of the said patent issued on my companion application above identified embodies co-ordinated and aptly related mechanisms for performing a series of operations incident to the production of a composite can body of known structure, the opposite edges of whose formed body blank are secured together by a sheet metal strip. These operations are performed at a series of stations A, B, C, D, E, indicated in the drawings of the said application and also in those of this application. In this machine, common to both applications but fully illustrated only in the earlier application, the principal operations are shearing a sub-blank from a larger blank and partially forming it at station A, completing the formation of the blank into a seaming strip at station B, reversing the seaming strip at station C and transferring it to a new line of feed, applying the seaming strip at station D to a can body blank fed from station C, forming the composite blank into the completed can body, and ejecting it at station E. Requisite feeds and transfers are provided.

The perfection of this machine and its maximum smoothness of operation and efficiency has been found to depend very largely on uniform correctness of the feed of the seaming strip during its formation and until it has been delivered to the overturn. It is here especially that every deviation from ideal operation must be guarded against and prevented or made to stop the machine at once to avoid damage and loss of time. This is the crux of the matter—the problem solved by this invention. The solution lies principally in (1) the supervision of this feed by the utilization of the former dies as definitely and correctly placed and maintained guides leaving just sufficient room for the blank or strip to be fed with due freedom and accuracy, and (2) the provision of stop motion mechanism under separate control of different phases of the feed, and under separate control also of the operative power connections to the feed when the condition of such connections becomes abnormal. The perfection of the feed insures proper delivery to the stop motion devices, and materially lessens the frequency with which the stop motion mechanism is called into play. The feed perfecting means thus cooperates with the stop motion mechanism to minimize wear and tear on the latter and to cut down the idle time of the machine, and with the associated stop motion mechanism further insures proper feed to the mechanisms beyond the overturn, thus preventing excess feed thereto with consequent jamming, and, on the other hand, avoiding failure of feed with resulting imperfection in the product. Other contributing factors will appear and stop control mechanism for other feed and transfer movements further safeguards the machine and co-operates with the mechanism in advance of the overturn, and with that associated with the overturn, to insure that the normal product of such advance and overturn mechanism shall be taken care of or the machine stopped.

Referring to the drawings:

Fig. 1 is a side elevation of the machine, parts of the frame being broken away as indicated, and parts of the body blank magazine, feeding mechanisms, etc., being shown in section.

Fig. 2 is a plan, the die or presser at B being in section.

Fig. 3 is an incomplete and partially diagrammatic cross section in the plane separating the A and B station dies.

Fig. 5 is a detail side elevation at the station B looking toward the far side of the machine in Fig. 2;

Fig. 6 is a transverse section at station B on the line VI—VI, Fig. 2.

Fig. 7 is a perspective of the detector-control mechanism $w$ located between stations B and C;

Fig. 8 is a central vertical section illustrating the said structure in detail.

Fig. 9 is a section on the line IX—IX, Fig. 8.

Fig. 10 is a detail perspective showing the switch contacts of Figs. 8 and 9.

Fig. 11 is a perspective of the switch and switch operating member of the control $z$.

Fig. 12 is a transverse vertical section substantially on the line XII—XII, Fig. 2.

Fig. 12$^a$ is a detail of the cam of Fig. 12.

Fig. 13 is a detail plan, partly in section, of the switch of Fig. 12.

Figure 14:
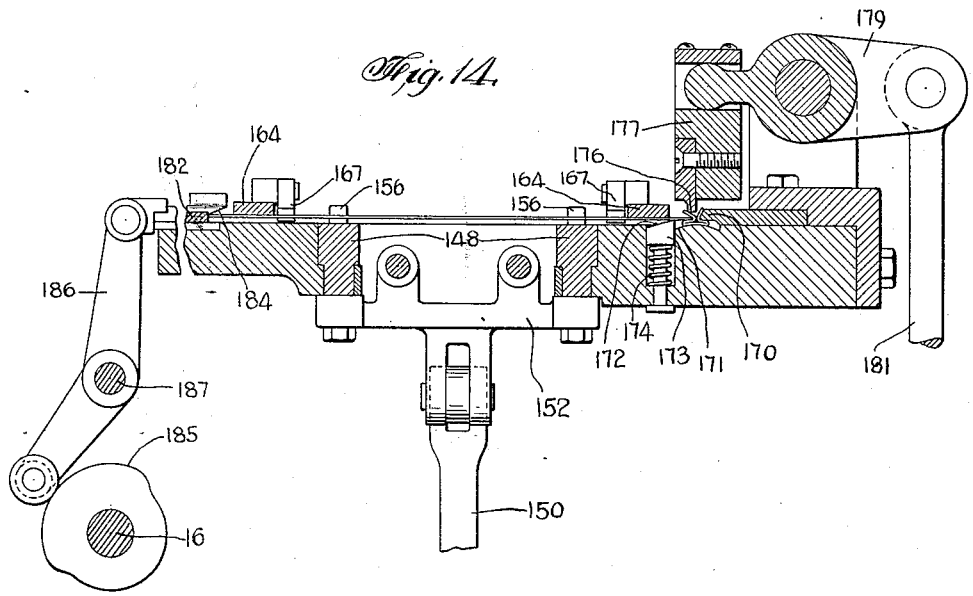

Fig. 14 is a transverse section at station D on the line XIV, Fig. 2.

Fig. 15 is a detail longitudinal section through the control $y$.

Fig. 16 is a simplified wiring diagram illustrating a suitable circuit arrangement for the control of the stop motion, and Fig. 17 is an end elevation partly in section at station E.

The general lay-out of the machine and the relative location of the principal mechanisms and in particular of the novel features peculiar to the present application is indicated in Figs. 1 and 2, the feed being in general from left to right in these figures from stations A, B, C, D, to E. Referring to Figs. 1, 2 and 17, the source of power may conveniently be the motor 1 mounted on the base 2 of the machine and which, through the clutch and clutch-applying means 3, with which is associated the brake drum 4, brake band 5, brake-applying spring 6, and holding-off magnet 7, drives the shaft 8 and by worm and worm wheel connection the shaft 9 supported from the base in standards 10, wherein also the end of the shaft 8 is mounted, and in standards forming part of the side frames 11. The shaft 9 operates the can body formers at station E, and through spiral gears 12—13 without speed change drives the longitudinal shaft 14 from which power is delivered by connections hereinafter described, and as in my said co-pending application, to the reciprocating die cross head at stations A and B. Shaft 14, as by chain 15 drives countershaft 16, from which various mechanisms including the station A blank feeds may be driven. Shaft 9, through gears 17, 18, drives shaft 19, which operates the end feed of the strip, and the feed of the fibre can body blank and the composite blank as hereinafter explained, and as in the old machine.

The storage and feeding to station A of sheet metal blanks or sub-blanks being no part of the present invention and being fully illustrated in my said co-pending application is shown herein only diagrammatically, 20 indicating a magazine for sheet metal blanks, 21 blank supporting rails, 22 means, as a suction head, for separating the lowest blank from the rest, 23 feed fingers carried by a twin reciprocatory slide and 24, 24' staggered feed dogs carried by a slide 25 reciprocated in suitable coordination with the slide carrying the feed fingers 23.

The seaming strip $e$ is preferably partially formed at station A into the shape indicated by dotted lines in Fig. 3 and completed at station B into the well-known form shown at Fig. 8 as in the old machine. Much of this mechanism, including the endwise feed devices per se of the strip, is unchanged but as it forms part of novel combinations claimed herein or is closely related to the present invention it will be fully described. In Figs. 1 to 6 wherein the mechanism for forming and feeding the seaming strip is shown, cross head 26, carrying the movable station A die and guiding and actuating the movable station B die, is mounted to slide in upright guides 27 above the table top 28, being suspended from crank shaft 29. This shaft 29 is driven from shaft 14 through upright shaft 30 geared thereto and through gears 31, 32 on shafts 30 and 29 respectively.

The die 33 at station A having a shearing edge 34 cooperating with fixed plate 35 to cut off the end of a larger blank held against the face of the fixed plate 36, also cooperates with the fixed male die 37 to form the blank into the shape indicated in dotted lines and discharges same by stripper 38. The crosshead also guides and operates the vertically movable presser die at station B.

Securing a uniform and correct feed from station A to station B has proved to be both difficult and important, since any lack of uniformity or accuracy in this feed interferes with the operation of the machine as a whole and slows it down below what would otherwise be its capacity, and since elimination of occasional defects in this feed has proved a problem. The long and narrow character of the strip and the fact that it is fed by being pushed at the middle of one end exaggerates slight errors of angle and produces a tendency of the front end of the strip to tilt or ride up out of its normal path so as to produce jamming and interference with proper operation. These difficulties have been obviated by utilizing the dies at station B, both the side former dies and the overhead presser die as well, as guides. This is done by providing means for locating them adjustably and with precision and maintaining them against further separation so that in their separated positions they form a guide passage of just the right transverse dimensions to insure uniformly accurate feed of the strip, thus precluding the defects in operation just mentioned, jamming, riding up or other deviation of the front end of the strip from its true path and facilitating the smooth running of the machine, thereby increasing its product by avoidance of stoppages otherwise occasionally arising from irregularities in this feed.

Although the mechanism employed to accomplish these objects and chosen for illustration and description herein has been found effective, it is of course not exclusive of other embodiments of the invention, and particularity of description must not be understood as a limitation of the invention to the details specified, but as a measure of simplicity and convenience warranted in view of established principles of patent law. It will be understood that the invention may be variously embodied.

On the table top at station B is mounted the stationary die-block 39, located in line with the base die block at station A, and having a long narrow rib of frusto-conical cross section constituting the base die and having the upward and inward die inclines 40. At each side of the die-block 39 is a side die-block 41 mounted to slide on dovetail ribs 42 and carrying side dies 43 undercut at their front ends whose surfaces are parallel to those of the adjacent die inclines. The means for separating the dies includes a spring and the extent of their separation is limited, the die blocks being resiliently held in the position of separation. In Fig. 6, springs 44 reacting against the fixed die block thrust the side die blocks outward against stops 45 shown as pairs of bolts adjustably mounted in standards 46 on the table top and having lock nuts 47. These stops limit, and by their adjustment determine, the extent of the separation of the side dies and the width of the space which may be occupied by the partially formed blank or seaming strip which is fed from station A between them. By adjusting these stops the width of the feed space may be made substantially the same as that of the partially formed blank, i. e. just enough more than the said width to insure an easy sliding fit. The side die-blocks are each provided with spaced wear plates 48 for cooperation with bolts 49 on a pair of correspondingly spaced bell cranks 50 carried by rock shafts 51 mounted on the frame below the top of the table on each side of the feedway and having at their front ends arms 52 projecting toward each other and having slotted overlapping ends receiving motion from rod 53 and pin 54 carried thereby, the slots allowing lost motion and the arrangement also permitting the upright arms of the bell cranks to move outward out of contact with the side die-blocks. Rod 53 is mounted for vertical reciprocation in bracket 55 by cam 56 on shaft 29 operating on cam roller 57.

In the old machine the movable overhead presser die at station B was located far above the blank fed between it and the fixed die so that it could not act as a guide for the strip so as to preclude the feeding of more than one blank or the jamming of a blank between said dies. The present invention provides means for definitely predetermining not only the width, as already explained, but also height of the guide passage constituted by the former dies at station B between which the partially formed blank is fed. The height like the width will best be made substantially the same as the corresponding extreme cross sectional dimension of the blank to be fed into the space or guide way between the dies so as to permit a free but guided feed.

Referring to Figs. 1, 2, 4, 5 and 6 in which is shown the means by which the presser die is constructed and arranged so as to have the added strip-guiding function; the overhead presser die 58 mounted in a slot 59 in the cross head and shown as having guided connection therewith through the dowal pins 60 may be regarded as "floating," being supported from the table top 28 by a pair of levers 61 fulcrumed in uprights 62 and whose front ends are received in slots 63 at each end of the presser. The rear ends of the levers are drawn down by the adjustable tension of springs 64, a movement limited by the adjustable stops 65 on posts 66. The presser is thus held at a definite, but adjustable, maximum distance from the fixed die so that it can not be pushed upward beyond that position by the strip being fed into position between the dies, but can be moved beyond it only by adjustment of the stops 65. The overhead die is resiliently held in guide position, the connections to the die including a spring and tending to produce die separation. The effectiveness of the presser die 58 as a guide is enhanced by forming its rear end to which the front end of a partially-formed seaming strip is first presented as a horn or guide 67 extending in counter-feed direction and back from the face of the presser in the plane of its reciprocation. The under or guide surface of this horn is curved so as to conduct the strip to the space or guide passage formed by the pairs of dies at station B. The illustrated means of mounting the presser die leaves it in the path of the crosshead 26 and subject to actuation thereby toward the fixed die, lost motion being provided for as indicated and a spring or springs weaker than the springs 64 being, if desired, interposed between the opposed parts of the cross-head and presser die.

Figure 4:
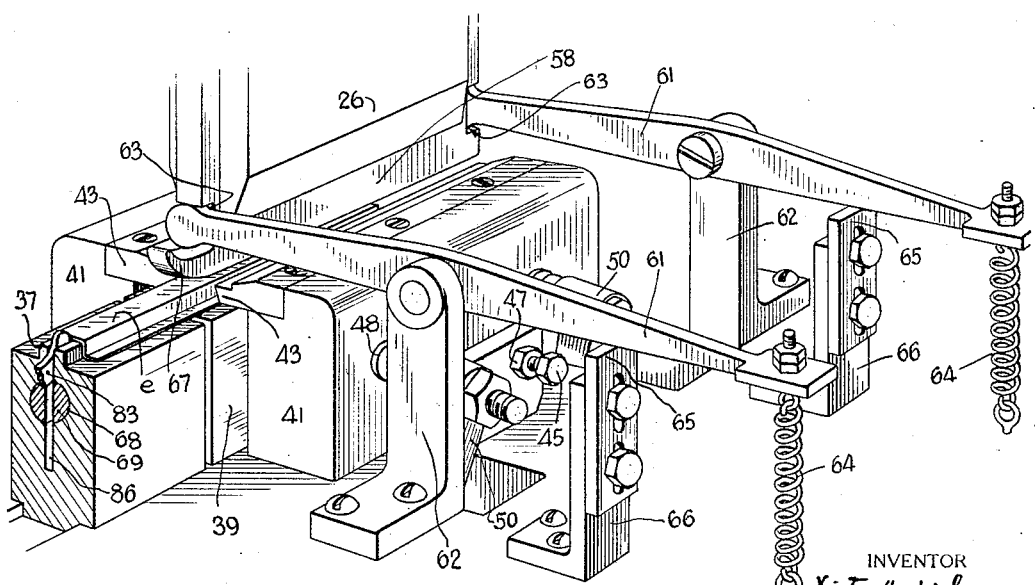
Fig. 4 is a perspective of the feed-way and the dies at station B showing the manner in which a strip is guided while being fed from station A to station B and the way in which the presser die is supported.

The means for feeding the blank and seaming strip lengthwise from A to B to C is the same as that fully illustrated and described in my said co-pending application and is best shown in the drawings of the present case in Figs. 1, 4 and 5. This feed is as follows: In a bore or cavity 68 extending lengthwise beneath the base dies at stations A, B and C, and located in the central vertical plane of said dies is a feed-dog-carrying slide 69 reciprocated from counter shaft 19 by eccentric and strap 70 and bell crank 71 fulcrumed on bar 72 and having its arms 73 connected by overstrain release link 74 to rod 75 parallel to the feed-dog carrying slide-rod 69 and connected thereto by crosshead 76. The overstrain release link is preferably constructed, as shown, as a pair of jaws 77, 78 pressed toward each other by a spring 79, reacting on one of the jaws and on the head of adjustable bolt 80 to cause them to grasp with adjustable tension the pin 81 on the bell crank, the link as a whole being pivotally connected at 82 to the rod 75 and serving in known manner to maintain the connection undisturbed except on abnormal strain, whereupon the pin of the bell crank is pulled out from between the jaws allowing the link to drop and stop the feed. The slide rod 69, slotted preferably at intervals for that purpose, carries spaced pivoted feed-dogs 83 spring-pressed toward active position and movable in slots 84 in the die and die-base. Shortly before the forward feed stroke, i. e. during the latter part of the return stroke, the dogs are projected into feeding position and shortly before the return stroke, i. e. during the latter part of the feed stroke, the dogs are retracted out of feeding position. This is accomplished in the illustrated construction by a feed-dog-controlling strip 85 mounted in a slot 86 below and in line with the slots in which the feed dogs are mounted, this strip being supported on fixed spaced pins 87 by notches in its underside having straight and inclined portions 88, 89, respectively. A pair of spaced pins 90 on feed-dog slide rod 69 cooperating with opposite sides of lug 91 on the strip 85 reciprocates it alternately in opposite directions, thereby lowering it so that the straight portions 88 of its notches rest on the pins 87 thus permitting the projection of the dogs by their springs, or on the other hand raising the strip so that its lower edge rests on the pins thereby retracting the dogs from feed position. To permit this movement of the strip 85 toward the feed dog slide rod 69, a slot is provided in the underside of said rod to receive lug 91 when in its highest position.

There are in this machine certain critical points at which abnormal conditions, as excess feed or failure of feed of the seaming strip or other blanks, or in the condition of the feeding mechanism may cause improper action, waste of material or breakage of the parts, and to avoid such results, I have located at such points detector-control means operating on the occurrence of such conditions through stop motion mechanism to stop the machine. Such control devices preferably include electrical circuit-controlling means which, where an electrical motor is the source of power, break the power circuit and at the same time apply the brake or permit it to be applied.

There are four of these stop motion mechanism detector controls $w$, $x$, $y$, $z$, of which all but the last safeguard the endwise strip feed, $w$ and $x$ cooperating with the feed itself and $y$ with the power connections to the feed slide. The remaining control $z$ is used to protect can body blank feeds. Detector-control $w$ is located between stations B and C where it is subject to operation according to strip feed conditions at that point.

In a broad sense the term stop motion mechanism is inclusive of the detector-control mechanism and of the ultimate circuit breaking and brake applying or other ultimate stop motion devices, but it is at times convenient to regard the several functions of this total mechanism separately and to sub-divide it into detector-control or detector, and control mechanism and stop motion mechanism. Each of these points of view is reflected in the claims, each of which is a separate unit.

The preferred circuit arrangement of these detector-controls is indicated diagrammatically in Fig. 16, where the electrical circuits are shown in a simplified form, and in which the lines $L_1$, $L_2$, $L_3$ deliver current, when the circuit breaker 92 is closed, to the motor 93, the winding 7 of the brake control magnet being connected across lines $L_2$, $L_3$, thereby normally energizing the magnet and holding off the brake band from the brake drum. The operating coil of the circuit breaker is preferably included in a normally closed circuit containing in series the switches of the controls $w$, $x$, $y$ and $z$, so that breaking of the circuit at any one of these points will deenergize the operating coil, open the main circuit to the motor and permit spring 6 to apply the brake band 5 to the brake drum 4. A manually controlled switch $a$ is also included in the control circuit. The circuit arrangements may be widely varied and may include numerous refinements familiar to those skilled in the art, the illustration or description of which would needlessly complicate the present case.

The location in the machine of the detector-control mechanism *w* is indicated in Figs. 1 and 2, and its construction shown in detail in Figs. 7 to 10. Above the feed-way for the seaming strip, which at this point is a groove of appropriate cross section, is suspended a detector guide member 94, which is best constructed as a long strip or bar, slightly narrower than the groove and having its ends 95 upturned to avoid any interference with or obstruction of the seaming strip which, in the normal operation of the machine, is being fed along beneath it. This detector strip is intended to rest on the seaming strip and is preferably hung pivotally at the point 96 from the arm of a lever 97 extending transversely of the feedway and fulcrumed at 98 on bracket 99 supported on the table top. A spring 100 tends to swing the detector-carrying arm of the lever downward around the fulcrum 98, thus pressing the detector against a strip when one is present. This movement during the normal operation of the machine, is stopped by the strip at an intermediate feed position, and before the machine is started, and when therefore no strip is present, is blocked by the manually movable latch or stop block 101 pivoted at 102 and then in its obstructing position. The lever 97, movement of whose detector-carrying arm is in the operation of the machine controlled by the character of the feed, determines a corresponding but reduced movement of the shorter or switch-operating arm 103 of the lever and of the switch contact operated thereby. The switch operated by this arm thus has a feed position corresponding to the feed position of the detector member and in which position in the wiring illustrated, the circuit is maintained closed. Movement in either direction from this intermediate feed position beyond a short permissible distance, will break the circuit, stop the machine and apply the brake in the manner already explained. Such movement will occur either when no strip is being fed or on excessive feed when there is a jamming of the strip or a feeding at the same time of two strips so that an undue vertical space in the feedway groove is occupied and the detector member moved upwards beyond its feed position. The switch, which may be supported by suitable means from the table as by bracket 104, has the usual base 105 in which are mounted overlapping contacts 106, 107, connected in the circuit. With these contacts cooperates the movable contact 108, carried by the switch lever 109 pivoted at 110 to a post 111 mounted in the switch block and operatively connected to the arm 103 of the lever 97 by adjustable connections 112, whose ends are pivotally connected respectively to the lever arm 103 at 113 and to the switch lever 109 at 114. The length of the lever 109 and the location of the point 114 are preferably such as to leave the motion of contact 108 reduced as compared with that of the detector 94. The movable contact 108 is preferably mounted in a tubular bore in the end of the switch lever, being pressed outward against the fixed contact by spring 115.

As a further means of safe-guarding the machine against faulty operation of the endwise feed, provision is made for cutting off current from the motor and braking the machine when, for any reason, excess strain is put on the feed slide connections in the forward or feeding stroke of the feed-dog-carrying slide-rod 69. This is the control *y* above referred to. It is described at this point out of its alphabetical order as a matter of convenience. This mechanism consists of a movable strip or bridging member 116 hinged to one of the side frames 11 at 117 and extending from that point beneath the overstrain release link 74 throughout its whole path and within reach of the end of the falling link when released on excess strain which causes the pin 81 on the upright arm 73 of the ball crank 71 to be pulled out from between the spring-pressed jaws 77, 78. The end of the strip 116 remote from the pivotal point rests on a switch operating member 118 pivotally connected to the switch lever 119 which on cross bar 120 carries the movable contacts 121 cooperating respectively with the fixed contacts 122 mounted in the base 123 supported on bracket 124 and connected in the circuit as indicate in Fig. 16. Falling of the overstrain release link depresses the strip 116 and thus breaks the circuit.

The seaming strip is formed with its doubled portion or back uppermost and with the free ends of the flanges extending outward and downward from the reentering spaces formed thereby at each side of the strip, which is supported on the feedway by these flanges which rest on it. The feedway at stations A and B and C (see Figs. 1 to 8 and 12) is elevated above the table, there being at and below the station C a further feedway for the strip at a lower level. The principal purpose of this arrangement is to provide space for the overturning of the feed strip so that when it reaches the lower lever it will rest on its back or doubled portion. To this end also, the upper feedway terminates at station C in a ledge 125 so narrow that the strip is overbalanced outwardly, the other doubled edge of the strip being guided by the vertical wall 126 so that the strip is prevented from falling only by the abutment-trip 127 which in its dotted line position in Fig. 12 acts as a guide for the strip as it is fed endwise. This abutment-trip which is pivoted at 128 in bracket 129 on the table top receives appropriately timed movement by link 130 etc., and as in my said co-pending application, releases the strip and thereby permits it to fall to the lower level turning over as it does so, the pins 131 aiding in this.

Detector control $x$ is located on the table top just beyond station C and the overturn just referred to. Its purpose is to provide a still further safeguard against improper feeding of the strip at the upper feed-way level, and more particularly to insure stoppage of the machine should the strip be fed endwise too far so that it would not be delivered properly to the lower level and so that in consequence the orderly operation of the mechanism at the lower lever beyond this point would be interfered with. The detector member in this case is the horizontally disposed lever 132, 133 fulcrumed at 134 on the table top and whose arm 132 extends into the path of the strip and is urged by spring 135 in counter strip-feed direction. The arrangement is such that the strip is normally fed a little beyond its desired final position and returned thereto by the action of the lever without interference with the operation of the machine, but if the strip is fed too far beyond its desired final position the further movement of the lever insures stoppage of the machine. To this end the arm 133 of the lever is provided with cam 136 having a lost-motion connection with the push-button of the switch and by which on the occurrence of such undue excess feed, the push-button is actuated. The switch is thus operated only where the feed exceeds a predetermined maximum, the spring under such circumstances being unable to return the strip and stoppage of the machine being required. The switch proper (see Figs. 12 and 13) is substantially like the switch of Fig. 11 above described. It has a base 137 supported from the frame and in which fixed contacts 138 are mounted, and has the movable contacts 139 carried by switch lever 140 pivoted to post 141, and urged upward by the spring 142 coiled around its pivot. The push-button 143 is pivotally connected at 144 to the switch lever.

The seaming strip having been correctly positioned on the upper level at station C and reversed in its fall to the table top 145 is re-aligned and moved sidewise, as in my said application, into the path of strip-feeding means by a pusher slide 146 actuated by connections not shown and whose forward end remains in contact with the strip and acts as a guide to the strip as it is fed endwise.

Opposite the station C is located a magazine 147 for can body blanks beneath which in slots in the table is mounted for reciprocation lengthwise of the machine a twin feed slide 148 which is provided with means for feeding the seaming strips and also the can body blanks lengthwise of the machine. This feed slide 148 is reciprocated from counter-shaft 19 by eccentric and strap 149 and bell crank 150 mounted on cross-rod 72, a link 151 serving as a flexible connection between the upright arm of the bell crank and the cross connecting yoke 152 of the feed slide. On the part of the feed slide on the side toward the seaming strip feedway is provided a series of spaced feed fingers 153, 154 which may be as fully illustrated and described in my said companion application and which therefore are shown here only diagrammatically. The feed slide 148 also carries at its rear end a pair of fixed feed fingers 155 for cooperation with the lowest blank in the feed magazine and pairs of pivoted feed dogs 156 spring pressed into feed position and in line transversely of the slide, the backs of the dogs being bevelled to insure their depression below the plane of feed on the return stroke of the feed slide. Suitable means for separating the lowest blank from the pile of can body blanks in the magazine is provided, as indicated more or less diagrammatically in Figs. 1, 2 and 12. The pile of can body blanks is supported on side rails 157 and the middle part of the lowest blank is pulled down away from the rest of the blanks past the serrated face of the pivoted spring-pressed back piece 158 into the path of the fingers 155 and below the foot 159 at the front of the magazine by separating means diagrammatically indicated as a pneumatic sucker, whose body 160 connected by hose 161 to a source of negative pressure may be reciprocated vertically by suitable mechanism not shown and whose flexible mouth 162 grips the blank releasing it in due course to the feed slide which moves successive blanks down inclined rails 163 in prolongation of the rails 157 to the plane of the seaming strip feedway.

Blank retraction is prevented by a hold-down and hold-back frame having longitudinal members 164 and a cross member 165 and hinged at 166 at each side of the front of the magazine. Hold-back dogs 167 are pivoted on pins 168 at diametrically opposite points on the respective longitudinal members 164 so as to form pairs having their feed faces in the same plane crosswise of the slide. Each such dog is provided with a stop pin 169 which, by contact with the adjacent member 164, limits the downward movement of the front face of the dog which takes in behind the rear edge of each blank fed past it, thus preventing blank retraction on the return of the slide and enabling the blanks to depress the feed dogs 156. The feed fingers 153, 154 operate in a plane below the inclines, slots or spaces under the adjacent blank supporting rail 157 and inclined rail 163 being provided for that purpose, all as in my co-pending application. The formed and reversed seaming strips and the can body blanks are thus fed forward together side by side in pairs to station D where is located means for associating the seaming strip and can body blank of a pair with their adjacent edges overlapped and means for permanently securing the strip and blank together. In this as in my co-pending application the can body blank is pushed edgewise and crosswise of the machine into the angular space between the adjacent edge of the doubled back portion of the seaming strip and the adjacent upwardly and outwardly projecting free flange, which is then fastened to the edge of the blank. During these operations the seaming strip is positioned in contact with a fixed longitudinal rabbeted guide 170 which occupies the angular space at the other side of the seaming strip which rests with its back on the curved portion 171 of the table top. Adjacent this curved portion is located a blank-edge-deflecting incline 172 beneath the can body blank and extending upward and toward the seaming strip and preferably formed on the block 173 parallel with the seaming strip and pressed upward a limited distance by springs 174, so as to raise its top front edge to, but not above, the level of the surface of the adjacent doubled back portion of the strip. An end stop 175 is also provided to insure proper location of the seaming strip in readiness for clinching to the body blank, its front free flange being directly under the clincher hammer 176 on slide 177 mounted for vertical reciprocation in standards 178 by lever 179 fulcrumed on the frame and operated from counter-shaft 19 by eccentric 180 and rod 181. Before the clinching operation occurs, the can body blank is fed crosswise of the machine beneath the hold-down frame 164, 165, whose longitudinal member 164 adjacent the incline 163 acts to hold the blank against the table top and prevent it from moving up too far. The can body blank is moved crosswise by pusher slide 182 mounted in ways 183 and having at its front edge an upward and forward bevel 184 for properly locating the edge of the blank and with which also co-operates the adjacent longitudinal member of the hold-back frame 164, 165. The pusher slide is operated by cam 185 on counter-shaft 16 acting through lever 186 fulcrumed on the frame at 187 and having its end pivoted to a lug on the slide. The relative timing of the pusher slide and the securing mechanism is such that as soon as the can body blank and seaming strip are correctly associated a quick hammer blow is struck which completes the composite can body blank, whereupon the blank is fed forward to station E where it is formed into can body shape and permanently secured therein. Two can body blank feeds thus occur beneath the hold-down and hold-back frame 164, 165 and it is with this movable frame that the final detector control stop mechanism z is associated. The danger to be guarded against here is an excess feed or a folding-up or wrinkling of the blanks either in their feed lengthwise or as individual blanks are pushed crosswise into overlapping relation with the seaming strip prior to the fastening of the seaming strip thereto. Should such improper feed occur, the hold-down and hold-back frame would be swung up around its pivot beyond its normal position. In order to take advantage of this abnormal movement there is secured to the middle of the crossbar 165 a switch-operating member 188, adjustably connected with the operating button 189 of a switch mounted on a convenient part of the frame, suitably that portion of it between the operating links of the respective blank formers at station E. This switch is substantially a reversal of the switch shown in Figs. 12 and 13, the fixed contacts 190 mounted on the base 191 being located below instead of above the movable contacts 192 on the switch lever 193 pivotally mounted on post 194 and to which operating button 189 is pivotally connected at 195. The movable contacts as thus arranged are normally held against the fixed contacts by the hold-down and hold-back frame weighted at 195. The contacts are connected in the circuit as indicated in Fig. 16. Breaking the circuit at any of the control points stops the machine.

The can body forming and ejecting mechanism at station E, shown in Fig. 17, is the same as that of my co-pending application above referred to and does not require detailed description.

I claim:

1. Apparatus of the character described comprising a pair of dies, means for feeding a blank between said dies when separated, stop means determining the maximum separation of the dies, spring means for maintaining the maximum separation thus determined whereby the dies act as guides for a blank as it is fed between them, power means, and lost motion operative connections therefrom for causing relative movement of said dies toward each other to form the blank.

2. Apparatus of the character described having a frame and comprising a feedway, a side former die at each side of the feedway, operating means therefor, lost motion connections between said operating means and said side dies, adjustable stops for said side dies mounted on the frame, spring means for separating said dies and for maintaining them separated by a distance predetermined by said stops, and means for feeding a strip endwise between and along said side dies which act as guides during said feeding.

3. Apparatus of the character described comprising side former dies, stops limiting their separation to substantially the width of the blank to be formed, spring means urging said dies outward against their stops, means for feeding a blank endwise between said side dies with its opposite edges guided by the respective die faces, and means for actuating said side dies against said spring means to form the blank between them.

4. Apparatus of the character described, comprising a feedway, a die at each side of the feedway, means for feeding a blank between and along said dies, stops for said dies determining the maximum extent of their separation, spring means for maintaining them against said stops, a power shaft and lost motion operative connections between said shaft and dies independent of said stops for moving said dies inward from their position of separation to act on a blank.

5. In apparatus of the character described, a pair of relatively movable dies, adjustable stops in the path of said dies limiting their separation, and power driven lost motion operative connections to said dies for moving them toward each other to act on the blank, said connections outward having continued movement after the stop-determined position of the dies has been reached.

6. Apparatus of the character described, comprising side former dies having free undercut parallel edges held separated from each other when not engaged in the forming operation by a predetermined variable maximum distance, equal to substantially the maximum width of the strip to be fed between them, means for feeding a strip along the dies beneath their separated undercut edges which during said feeding act as guides for the strip, and power means having initial lost motion for moving said dies inward toward each other to act on the strip.

7. Apparatus of the character described, comprising a long narrow feedway, die blocks at each side thereof slidable toward and from each other, side former dies carried by said die blocks and having parallel free edges, operating means for forcing said side dies toward each other in the forming operation, springs urging said die blocks outward, adjustable stops in the outward path of said die blocks predetermining the extent of the separation of the free edges of the side dies, and means for feeding a strip endwise between the side dies when so separated.

8. Apparatus of the character described, comprising a pair of dies one of which is fixed, means for feeding a blank between said dies when separated, a stop determining the maximum separation of the dies, spring means for maintaining the movable die in the position predetermined by said stop, where it acts as a guide for a blank as it is fed between the dies, power means, and lost motion operative connections therefrom to the movable die, for moving it from said position toward the other die to act on the blank.

9. In apparatus of the character described, a crosshead, means for reciprocating the crosshead, a pair of dies, one of which is movably mounted with reference to the crosshead, means independent of the crosshead for supporting said movable die from the frame of the machine at a definite maximum distance above the other die, and lost motion operative connections between the crosshead and said independently supported die.

10. In apparatus of the character described, a pair of dies, a crosshead, means for reciprocating the crosshead, adjustable means independent of the crosshead for supporting one of said dies from the frame of the machine at a definite maximum distance from the other die and between it and the crosshead for operation thereby.

11. Apparatus of the character described, comprising means for forming a blank in stages including successive sets of dies, means for feeding a partially formed blank from the first set of dies to and between those of a later set, the first set of dies having a rib portion extending in the direction of the blank feed and forming an internal guide for a partially formed blank as it is fed to the later set of dies, which are side dies and by virtue of their accurate location act as external guides for the partially formed blank during said feeding, means for maintaining said side dies in their outermost position with their maximum separation substantially the maximum width of the strip, and means for producing relative reciprocation of said dies including lost motion operative connections.

12. Apparatus of the character described, comprising a feedway extending lengthwise of the machine, a plurality of sets of dies arranged successively along the feedway, and means for feeding the blank partially formed by the first set of dies to the next set, the first set including an internal longitudinal guide for the partially formed blank and the second set furnishing an overhead guide and external guides for the partially formed blank as it is fed from the first set of dies to and between the second, both the overhead guide and the side guides extending lengthwise and being accurately placed for the performance of the guiding function on the strip being fed.

13. Apparatus of the character described, comprising a feedway having a die, an overhead die associated therewith and which serves also as a guide, means for supporting said overhead die from the frame of the machine at a definite maximum distance above the feedway but slightly in excess of the extreme height of the blank, a crosshead having operative lost motion connection with said overhead die, means for feeding a blank endwise along the feedway between said dies, and means for thereafter reciprocating said crosshead and overhead die to form the blank.

14. Apparatus of the character described, comprising a long narrow feedway, an overhead die member above the same, means for maintaining the overhead die member in a definite outermost position with respect to the feedway in which position it determines and limits to a proper amount the space normally available for the strip to be fed along the feedway between it and the die member, the overhead die member so positioned having its end facing the feed extended back from its active face in the plane of the die and in counterfeed direction so as to constitute a guide for the incoming strip, means for feeding said strip endwise into the space between said dies, and means for moving the overhead die member toward the feedway to act on the strip.

15. A machine for forming seaming strips for composite can bodies providing stations at which the seaming strip is formed in stages, a feed finger contacting with the end of the blank in substantially its central longitudinal plane and pushing the blank and strip endwise from station to station, a reciprocating die at a station other than the first having a face portion opposing the die with which it cooperates and having its rear end extended in counterfeed direction away from the other die to act as an in-guide for the strip being fed, means for maintaining the movable die in its outermost position wherein it leaves the proper amount of room between itself and the other die for the strip and acts as a guide therefor, and means for reciprocating the movable die.

16. Apparatus of the character described, having a feedway for a blank, a crosshead above the feedway, means for reciprocating the crosshead, blank forming dies associated with said feedway, one of said dies constituting part of it and another being guided in the crosshead and being reciprocable toward and away from the die constituting part of the feedway, a pair of levers pivotally supported from said table and projecting into operative relation to the movable die, spring means for actuating the levers to sustain the movable die, adjustable stop means for determining the outmost position of the movable die, and means for feeding a blank along the feedway into the space between the dies, said construction enabling the dies to act as guiding means during the feeding of the blank between them.

17. Apparatus of the character described, having blank forming mechanisms arranged at successive stations, one of which mechanisms at a later station comprises two associated sets of dies at the same station, stops for the movable dies in said sets determining their outermost position, spring means for maintaining them in said positions, means for feeding into a position between the dies of said sets by motion along their faces partially formed blanks, two of whose extreme dimensions are respectively substantially the same as the respective distances between the corresponding outermost positions of the dies of the respective sets, and means for moving the dies inward from their outermost positions to form the blank.

18. Apparatus of the character described, comprising strip feeding and forming means including a feedway having a fixed die, side former dies extending lengthwise of the feedway and spaced apart a predetermined maximum distance, a presser member yieldingly held at a definite position over the feedway and thus forming with the side former dies a feed passage of definite width and height, said dimensions being substantially those of the strip being formed so that the side former dies and presser act as guides for the strip, means for feeding the strip endwise in said feed passage, and means for moving the presser and the side former dies inward from their normal positions as guides to form the strip and for returning them to guide position.

19. Apparatus of the character described comprising a feedway, means for feeding thereon a blank to be formed, stop motion mechanism, a detector member located adjacent the feedway, means operatively connecting said detector member and said stop motion mechanism, spring means urging the detector member toward the feedway, the connections between the said detector member and the stop motion mechanism permitting the detector member to have a limited amount of lost motion toward or from the feedway before the actuation of the stop motion mechanism is occasioned, thereby providing for stoppage of the machine on excess feed or failure of feed.

20. In apparatus of the character described, a feedway, means for feeding blanks along the same, stop motion mechanism, a feed detector, means for yieldingly urging it toward the feed path, a stop motion mechanism control, said detector and stop motion mechanism control being operatively connected together and each having a normal feed position between two stop positions to one or the other of which said detector and control are moved on movement out of feed position in either direction on the occurrence of excess feed or on failure of feed.

21. In apparatus of the character described, means for feeding stock, a detector movably mounted adjacent the feed path, spring means urging the detector toward the feed path so that its position depends on what if anything is on the feedway, a control switch having its movable member operatively connected to the detector, and an electric circuit in which the switch contacts are located and which controls the operation of the machine, both said detector and switch having a normal feed position, an excess feed stop position and a no feed stop position.

22. Apparatus of the character described comprising a feedway, means for feeding stock along said feedway, a lever mounted on the frame adjacent the feedway, a detector suspended from one arm of said lever over the feedway, a switch having its movable member operatively connected to the other arm of said lever, means for yieldingly urging the detector toward the feedway so that its position is determined by what if anything is on the feedway, stop motion mechanism, and an electric control circuit therefor in which the switch contacts are located.

23. Apparatus of the character described comprising a feedway, means for feeding a blank along it, a detector member located over said feedway, a lever fulcrumed on said table and which carries the detector member, spring means for moving said lever and detector member toward the feedway, a movable stop preventing when in position movement of the detector member toward the feedway from its normal feed position, and stop mechanism operatively connected to said lever and actuated thereby on failure or excess of feed except when the stop is in its operative position.

24. Apparatus of the character described comprising a feedway, means for feeding stock along it, a detector member movably mounted on the frame adjacent the feedway, spring means for urging said detector member toward the feedway, a movable stop preventing when in position the movement of the detector member toward the feedway from its normal feed position, a switch whose movable member is operatively connected to the detector member, and stop mechanism controlled by said switch.

25. In apparatus of the character described a long and narrow feedway, a feed slide having a feed finger in the central longitudinal plane of the feedway adapted to contact with the end of a strip to push it endwise along the feedway, means for reciprocating the feed slide, a detector guide member over the feedway, spring means for urging said member toward the feedway, stop mechanism, and means for controlling the same actuated by said detector guide member.

26. In apparatus of the character described, a feedway, forming dies associated therewith and providing a guide passage, means for feeding stock along said feedway, a detector control member adjacent the feedway beyond the guide passage in the direction of the feed and continuing the same and stop mechanism operatively connected to the detector control member.

27. Apparatus of the character described comprising means for feeding stock, stop mechanism, a detector control movably mounted adjacent the line of feed and constantly urged toward the same, operative connections therefrom to the stop mechanism, and another automatic control for said stop mechanism adapted to be actuated on the occurrence of an abnormal condition in the operative connections of said feed.

28. In apparatus of the character described, a feed slide, a power shaft, operative connections between said shaft and slide including an excess strain release, stop mechanism, a control operatively connected to said stop mechanism and subject to operation on the disruption of the connections to the feed slide on the occurrence of excess strain, and two distinct detector members with associated control mechanism supervising different phases of the feed and both operatively connected to said stop mechanism.

29. A machine of the character described comprising means for feeding a formed seaming strip, power means for driving said machine, stop motion mechanism, an absence-or-excess-feed detector operatively connected to the stop motion mechanism to stop the machine on the occurrence of either condition, and an end feed stop-detector also operatively connected to the said stop motion mechanism to cause the stoppage of the machine on excess endwise feed beyond a predetermined point.

30. A machine of the character described comprising power means for driving the machine, stop motion mechanism therefor, means for feeding a formed seaming strip endwise in the machine, an-absence-or-excess-feed detector, an excess end feed stop detector, an over-strain release link in the operative connections between the power mechanism and the endwise feed of the formed strip, and connections between each of said detectors and the stop motion mechanism and between the over-strain release link and the stop motion mechanism operative on the occurrence of any of the conditions indicated.

31. A machine of the character described comprising power means for driving the machine, stop motion mechanism therefor, means for feeding a formed seaming strip endwise in the machine, an absence-or-excess-feed detector, an excess end feed stop detector, an over-strain release link in the operative connections between the power mechanism and the endwise feed of the formed strip, and connections between each of said detectors and the stop motion mechanism, and between the over-strain release link and the stop mechanism operative on the occurrence of any of the conditions indicated, and hold down frame mechanism also operatively connected to the stop motion mechanism.

32. Apparatus of the character described comprising a feed slide, a power shaft, operative connections between said shaft and slide subject to disconnection without breakage on the occurrence of excess strain, stop mechanism, and means controlled by such disconnection for bringing the stop mechanism into action.

33. Apparatus of the character described, comprising feed mechanism including an over-strain release member, and stop mechanism having a part in the path of said member when released on over-strain for initiating the operation of the stop mechanism.

34. Apparatus of the character described comprising means for feeding a blank to be formed including an over-strain release link reciprocating in a prescribed path, and stop mechanism having a member located within striking range of the link at any point in its travel should excess strain release the link.

35. Apparatus of the character described comprising a blank feed including over-strain release connections, a switch, a switch operating bar below said over-strain release connections for operation thereby on release of the connections on over-strain, and means controlled by said switch for stopping and braking the mechanism.

36. Apparatus of the character described comprising means for feeding a blank to be formed including an over-strain release link reciprocating in a prescribed path, an electric switch, an elongated switch operating member located beneath said overstrain release link throughout the whole of its path and within striking range of the link at any point in its travel should excess strain release the link, and stop mechanism controlled by said switch for thereupon stopping the mechanism.

37. In apparatus of the character described, a feedway, means for feeding blanks lengthwise thereon, stop mechanism, an end stop detector located adjacent the end of said feedway in the line of feed, a control means operatively connected to said stop mechanism and having lost motion connection with said end stop, and spring means for moving said stop in counterfeed direction to return to proper position a blank given normal excess feed, or where the excess exceeds a permissible amount, actuating said control and stop mechanism.

38. Apparatus of the character described comprising means for feeding a blank, a lever located substantially in the plane of feed, an end stop carried by one arm of the lever in the line of feed, an operating cam carried by the other arm, spring means urging the end-stop-carrying arm of the lever in counter feed direction, and an electric switch having its operating member in lost motion operative relation to the cam.

39. Apparatus of the character described comprising a strip over-turn, means for feeding a strip endwise thereto, an end stop in the path of feed of the strip immediately beyond the over-turn, spring means urging said end stop in counterfeed direction, and stop mechanism actuated by said end stop on abnormal excess feed.

40. A machine of the character described comprising a feedway, means for feeding a strip endwise along said feedway, dies for partially forming the strip, other dies succeeding the first dies in the direction of the feed for completing the strip formation, a detector and guide member suspended over the feedway beyond said second set of dies and a strip over-turn beyond said detector and guide member, said dies, detector and over-turn structure insuring the guidance of the strip under formation through the dies and after completion to the over-turn structure, and stop motion mechanism controlled by said guide member.

41. A machine of the character described comprising a strip over-turn, means for feeding a strip endwise to said over-turn, and an end stop in the line of feed, spring means urging said end stop in counterfeed direction to correctly re-locate the normally overfed strip at the over-turn, stop motion mechanism and lost motion operative connections thereto from the end stop to actuate the stop motion mechanism on overfeed in excess of the normal.

42. A machine of the character described comprising a feedway, means for forming a seaming strip, means for feeding it endwise along the feedway, an overturn, stop motion mechanism, detector members located respectively adjacent the feedway at each side of the overturn, and stop motion mechanism controls operatively connected respectively to detector members.

43. Apparatus of the character described providing successive stations at which a blank is formed and at which it is reversed after formation, former die means at one of said stations including an overhead presser, and overturn mechanism at another, means for continuously guiding the strip from station to station said guiding means including said overhead presser and part of the overturn mechanism.

44. In apparatus of the character described, means for feeding blanks in two different directions, a hold down frame adapted to rest on the blanks and beneath which both said feeding movements are effected, and a stop mechanism control connected to said hold down frame for operation thereby.

45. Apparatus of the character described comprising means for feeding blanks, additional means for feeding said blanks at an angle to the first feed, stop mechanism, and a movable member urged into contact with blanks undergoing each of said feeds and operatively connected to said stop mechanism.

46. Apparatus of the character described comprising a table providing a feedway for blanks, means for feeding blanks along said feedway, a movable hold-down frame movably connected to the table adjacent the feedway and movable out of its normal position on the occurrence of excess feed, an electric switch normally occupying a predetermined position, mechanical connections between said hold-down frame and the movable member of the switch, whereby on the occurrence of excess feed both the hold-down frame and the switch are made to assume an abnormal position, an electric motor for driving the mechanism, and motor control circuit connections controlled by said switch.

47. A machine of the character described comprising blank feeds, a motor for driving the machine, a series of switches having their contacts connected in a normally closed circuit, and feed detectors corresponding respectively to said normally closed contacts and effective on the occurrence of abnormal feed conditions to open the circuit of the motor and apply the brake.

48. Apparatus of the character described comprising in combination, strip feeding means, strip forming and guiding means, an excess feed detector located at a point beyond the strip forming means and operatively related to the feed path of the strip, said strip forming and guiding and strip feeding means being adapted to insure proper passage of but one strip at a time to said detector, and stop motion mechanism operatively related to said detector.

49. A machine of the character described comprising in combination, means to feed a blank, longitudinally extending blank-forming dies adapted to insure correct guidance of the blank as it is fed by said means between said dies and to prevent feeding of more than one blank at a time to said dies, a detector of abnormal feed conditions located adjacent the feed path beyond the forming dies, and stop motion mechanism operatively related to said detector for control thereby.

50. Apparatus of the character described comprising in combination, a feedway, strip-forming side dies associated therewith and providing between them a guide passage, means for limiting the maximum distance between the said dies to substantially the width of the strip, means for feeding a strip along said feedway to and through said passage, an excess feed detector adjacent the feedway beyond the guide passage in the direction of the feed, and stop motion mechanism operatively related to the detector, said forming and feeding means being designed to insure proper passage of but one strip at a time to said detector thereby minimizing operation of the stop mechanism.

51. Apparatus of the character described comprising in combination, means for feeding a strip, two associated pairs of strip forming dies providing between them a guide passage for the strip, means for limiting the maximum height and width of said guide passage to insure free but accurately guided movement of the strip, a detector of abnormal movement feed conditions located beyond the guide passage and in operative relation to the feed path, and stop motion mechanism operatively related to the detector and controlled thereby.

52. A machine of the character described comprising in combination a feedway, means for feeding a formed seaming strip along said feedway, power means for driving said machine, stop motion mechanism, an end feed stop detector extending into the feed path and operatively connected to said stop motion mechanism to cause stoppage of the machine on excess endwise feed of the strip beyond a predetermined point, and means associated with said feedway for insuring proper passage of but one strip at a time to said end feed stop thereby minimizing the operation of the stop mechanism.

53. A machine of the character described comprising in combination, means for feeding a strip endwise, stop motion mechanism, a plurality of stop motion control devices associated with said feed and severally operative on abnormal feed conditions to stop the machine, and means for limiting the space through which the strip feed must pass and for guiding the strip so as to insure proper feed of but one strip at a time at a given part of the feed way and thus reduce the operation of the stop motion mechanism to a minimum.

54. Apparatus of the character described comprising in combination, means for feeding and forming a strip, a detector of abnormal feed conditions located adjacent the feed path, stop motion mechanism operatively related to said detector, blank and strip feeding means, and means for delivering the formed strips individually to the blank and strip feeding means.

55. Apparatus of the character described comprising in combination, means for feeding and forming a strip, a detector of abnormal feed conditions located adjacent the feed path, stop motion mechanism operatively related to said detector, blank and strip feeding means, blank and strip associating means, stop motion mechanism operatively related both to the blank feeding and to the blank and strip associating means, and means for delivering formed strips one at a time from the strip feeding and forming means to the blank and strip feeding means.

56. Apparatus of the character described comprising in combination, blank and strip feeding means, blank and strip associating means, stop motion mechanism operatively related both to the blank feeding and to the blank and strip associating means, and feed devices for delivering formed strips one at a time to said blank and strip feeding means.

57. Apparatus of the character described comprising in combination, means for feeding a strip, means for forming and guiding a strip, an overturn on the line of feed, stop motion mechanism, and an abnormal feed detector located between the strip forming mechanism and the overturn and operatively related to the stop motion mechanism.

58. Apparatus of the character described comprising in combination, means for feeding a strip, means for forming and guiding a strip, an overturn on the line of feed, stop motion mechanism, and an abnormal feed detector located between the strip forming mechanism and the overturn, and another abnormal feed detector just beyond the overturn, both said detectors being operatively related to the feed path and operatively connected to the stop motion mechanism.

59. A machine of the character described comprising a blank feed, a motor for driving the machine, and a series of severally operable switches associated with different phases of said feed for actuation on the occurrence of abnormal feed conditions and having their contacts located in a circuit controlling the motor and stopping the machine on such actuation of any of them.

60. In apparatus of the character described, strip forming mechanism comprising longitudinally extended parallel side former dies whose faces constitute also edge guides for the strip while it is being fed, means for feeding the strip endwise along and between said separated side dies, means for holding said side dies during the feeding of the strip in fixed separated positions with their die faces spaced apart substantially the width of the strip being fed, and means for causing said side dies to exercise their forming function on the strip.

61. Apparatus of the character described comprising two associated fixed pairs of cooperating relatively movable strip-forming dies, means for limiting the maximum separation of the dies of each pair to substantially the extreme cross-sectional dimensions of the strip, means for feeding the strip to be formed, without rotating it, between the dies of both pairs when in their positions of maximum separation and thus constituting guides for the strip, and means duly correlated for actuating both pairs of dies to effect the forming operation.

62. Apparatus of the character described, comprising two associated pairs of cooperating relatively movable strip-forming dies, means for limiting the separation of the dies of each pair to substantially the extreme cross-sectional dimensions of the strip, means for feeding the strip to be formed edgewise between the dies of both pairs when so separated and stationary, and means duly correlated for thereafter actuating both pairs of dies to effect the forming operation on the stationary strip.

63. Apparatus of the character described, comprising a pair of dies having opposed faces, means for feeding a blank between said dies when in fixed separated positions by movement of its edges along said die faces, and means predetermining and limiting the maximum separation of said dies to leave the proper amount of room between their die faces when in said fixed positions to enable them to act as accurate guides for the blank being fed.

64. In apparatus of the character described, strip-forming mechanism comprising longitudinally extended parallel relatively movable strip-forming dies constituting also fixed guides for the strip while it is being fed past them, means for feeding the strip endwise and flatwise along and between said dies, means limiting the separation of said dies to an amount sufficient for the passage of but one strip at a time, and means maintaining said limited separation during the feeding of the respective strips and including spring means.

65. Apparatus of the character described, comprising a pair of relatively movable dies, means for feeding a blank flatwise between said dies at the times when they are fully separated, means for limiting the separation of said dies to admit but one blank between them when fully separated and enable the dies themselves to act as guides therefor as the blank is fed between them, power means, and operative connections therefrom for causing relative movement of said dies toward each other from their guide positions to form the blank.

66. Apparatus of the character described, comprising elongated relatively movable strip-forming dies one of which is an overhead die which serves also as a fixed guide, means for feeding a strip endwise between the dies, means operative during the feed of the strip for preventing said overhead die from moving far enough away from its companion die to admit between them more than one strip, and means for reciprocating said overhead die in a vertical plane to and from but not upward beyond its said fixed guide position.

67. Apparatus of the class described, comprising a long, narrow feed-way, an overhead die member above the same, means for maintaining the overhead die member, while a blank is being fed along it, in a definite outermost position with respect to the feedway, in which position it determines and limits to the proper amount for a single strip the space than available for the strip to be fed along the feed-way between it and the die member, means for feeding said strip endwise into the space between said dies when so maintained, and means for moving the overhead die member toward the feedway from said maintained position to act on the strip.

68. In apparatus of the character described, a feed-way, means for feeding blanks edgewise along the same, an absence and excess feed detector located over and adjacent the feed-way, and floating on the blanks on the feed-way, stop-motion mechanism, and operative connections from the detector to said-stop-motion mechanism.

69. Apparatus of the character described, comprising a feed slide for advancing stock to be operated on by the machine, a power shaft, operative connections between said shaft and slide having parts subject to being forced without breakage out of their normal operative relation on the occurrence of excess strain, stop mechanism and means controlled by such displacement for bringing the stop mechanism into action.

70. In apparatus of the class described, a pair of longitudinally extending side dies, means for operating said dies including means for effecting their separation, and stop means limiting the maximum extent of such separation to less than the stroke of said operating means.

71. In apparatus of the character described, a relatively long and narrow feedway, side dies flanking the same, power means including operative connections for positively advancing the side dies, and stops limiting the separation of said dies to less than the backward stroke of the power means.

72. Apparatus of the character described comprising in combination, means for feeding stock, a movably mounted excess feed detector abutting on the feed path, extending lengthwise thereof and maintained in contact with whatever is being fed, devices associated with the stock feeding means for preventing feed of excess stock to said detector, and stop motion mechanism to which said detector is operatively related.

73. In apparatus of the character described, a relatively long and narrow die having its rear end extended lengthwise of the die in counterfeed direction and back from the face of the die in the plane of reciprocation of the die to form a guide, means for holding said die in its guiding position, fixed against movement therefrom away from the work, means for feeding a strip along the face of said guide, and means for actuating said die toward the blank.

74. Apparatus of the character described comprising a long and narrow feedway, means for feeding a strip along said feedway, a lever fulcrumed on the frame and extending transversely above the feedway, a long and narrow detector located over the feedway and suspended from an arm of the lever, and means for yieldingly urging the detector toward the feedway so that its position is determined by what if anything is on the feedway, and a switch having its movable member operatively connected to an arm of the lever, the length of the respective effective arms of the lever and the rest of the connections to the movable member of the switch being so related as to reduce its movement below the movement of the detector to which it corresponds.

75. Apparatus of the character described comprising a long narrow feedway groove, means for feeding strips lengthwise in said groove, a lever mounted on the frame adjacent the feedway groove, an absence and excess feed detector strip pivotally hung from said lever over the feedway with its under side parallel with and resting on the strips in the feedway groove, stop motion mechanism, and an electric circuit therefor under control of said detector strip.

76. Apparatus of the character described comprising a feedway, means for feeding stock along said feedway, a lever fulcrumed at one side of the feedway on an axis extending lengthwise of the feedway and having an arm extended over the feedway, an absence and excess feed detector strip pivotally hung from said arm on an axis extending lengthwise of the feedway and located over the feedway, said detector strip floating on the blanks on the feedway, stop motion mechanism, and an electric circuit therefor under control of said detector strip.

77. Apparatus of the character described comprising a long and narrow feedway, means for feeding a strip endwise along said feedway, a lever fulcrumed on the frame and extending transversely above the feedway, a detector strip located over and adjacent the feedway pivotally hung from an arm of the lever and urged toward the feedway and floating on the strips thereon, a switch having its movable member operatively connected to said lever, stop motion mechanism, and an electric control circuit therefor in which the switch contacts are located.

78. In apparatus of the character described, a long and narrow groove serving as a feedway for strips and having its bottom longitudinally slotted, a feed slide having a feed finger adapted to contact with the end of a strip to push it endwise along the feedway while moving in the slotted bottom of the groove, means for reciprocating the feed slide, a detector strip suspended over the feedway groove and resting on strips being fed therein, and stop mechanism under the control of said detector strip.

79. In apparatus of the character described, a feedway, means for feeding blanks lengthwise thereon, stop mechanism including electrical means, an end stop detector located adjacent the end of the feedway in the line of feed and having lost motion operative connection with said stop mechanism, and spring means for moving said stop in counterfeed direction to return to proper position a blank given normal excess feed, or where the excess exceeds a permissible amount, actuating said stop mechanism.

80. Apparatus of the character described, as set forth in claim 63, in which the dies are relatively reciprocable longitudinally extended strip-forming side dies one of which is resiliently held in its position of maximum separation from the other during the feeding of the strip.

81. Apparatus of the character described, as set forth in claim 66, in which the overhead die is resiliently held in its fixed guide position of maximum separation from its companion die.

82. Apparatus of the character described, as set forth in claim 66, in which a pair of elongated reciprocable strip-forming side dies is associated with the other strip-forming dies in symmetrical relation to the plane of reciprocation of the overhead die, and in which stop means are provided for limiting the withdrawal of the side dies, said side dies being resiliently held in their stop determined position wherein they act as side-edge guides for the strip while it is being fed.

83. Apparatus of the character described comprising elongated relatively movable strip-forming side dies having opposed faces which serve also as fixed edge guides, means for feeding a strip endwise between the fixed dies by motion along their opposed faces, stop means operative during the feed of the strip for preventing die movement outward beyond strip-guiding position in which said dies are resiliently held, and means for giving said dies relative reciprocation to and from but not outward beyond fixed guide position.

84. In apparatus of the character described, a pair of strip-forming dies including an overhead die resiliently held in the position of maximum separation from its companion die, stop means limiting such separation to substantially the corresponding maximum cross-sectional dimension of the strip to be fed between them, means for feeding the strip endwise between the dies in their separated position by motion along their die faces, and means for relatively reciprocating said dies including lost motion operative connections.

In testimony whereof, I have signed this specification.

VICTOR HENDRICKSON.